United States Patent [19]

Hazan et al.

[11] Patent Number: 4,990,769

[45] Date of Patent: Feb. 5, 1991

[54] CONTINUOUS CABLE FIBER OPTICAL PRESSURE SENSOR

[75] Inventors: Jean-Pierre Hazan, Sucy-en-Brie; Michel Steers, La Queue-en-Brie; Gilles Delmas, Epinay Sous Senart; Jean-Louis Nagel, Limeil-Brevannes, all of France

[73] Assignee: U.S. Philips Corp., New York, N.Y.

[21] Appl. No.: 410,764

[22] Filed: Sep. 21, 1989

[30] Foreign Application Priority Data

Sep. 27, 1988 [FR] France ............................ 88 12596

[51] Int. Cl.$^5$ ............................................ H01J 5/16
[52] U.S. Cl. ............................ 250/227.10; 250/231.10
[58] Field of Search .................... 250/227.16, 227.17, 250/227.14, 231.10; 73/800, 705, 768; 356/73.1

[56] References Cited

U.S. PATENT DOCUMENTS

| | | | |
|---|---|---|---|
| 4,342,907 | 8/1982 | Macedo et al. | 250/227 |
| 4,477,725 | 10/1984 | Asawa et al. | 250/227.16 |
| 4,488,040 | 12/1984 | Rowe | 250/227.17 |
| 4,552,026 | 11/1985 | Knudsen et al. | 250/227.16 |
| 4,560,016 | 12/1985 | Ibanez et al. | 250/227.16 |
| 4,678,903 | 7/1987 | Wlodarczyk et al. | 250/227.14 |
| 4,750,796 | 1/1988 | Shibata et al. | 350/96.29 |
| 4,814,563 | 3/1989 | Langston | 250/227.14 |
| 4,836,030 | 6/1989 | Martin | 73/800 |

FOREIGN PATENT DOCUMENTS 2176364 12/1986 United Kingdom .

*Primary Examiner*—David C. Nelms
*Assistant Examiner*—Michael Messinger
*Attorney, Agent, or Firm*—Ernestine C. Bartlett

[57] ABSTRACT

A fiber-optical pressure sensor, comprising a pressure member (21, 22) which encloses the optical fiber (20) in a sandwich-like manner, and used for the detection of intruders is provided. The pressure sensor is formed by a continuous cable which can be buried and which comprises at least one optical fiber (20) which is capable of detecting, along its entire length, components of a pressure applied to a surface zone of the ground, notably by an intruder. The cable can be wound along an axis of rotation which is substantially perpendicular to its longitudinal direction and can be bent in a direction which is substantially parallel to this axis of rotation. The pressure member may have a continuous or a segmented structure. It may be formed by plates (21, 22) or strips (21, 22) which are rigid or semi-rigid. The pressure member may comprise ribs (27, 28, 29) which serve to capture forces which act in the lateral direction.

15 Claims, 4 Drawing Sheets

CONTINUOUS CABLE FIBER OPTICAL PRESSURE SENSOR

FIELD OF THE INVENTION

The invention relates to a fiber-optical pressure sensor, comprising a pressure member which encloses the optical fiber in a sandwich-like manner in order to modify its optical properties as a function of a pressure applied to the sensor.

BACKGROUND OF THE INVENTION

A sensor of this kind is known from U.S. Pat. No. 4,342,907 describes an optical sensor for the measurement of stress, temperature, pressure, etc. by means of an optical fiber. This optical fiber can be deformed so that the transmission of light therein is modified. With reference to FIG. 11, the cited document describes a sensor enabling the detection of externally applied pressures. It is formed by two half-cylindrical solid parts which apply the pressure to the optical fiber which is thus deformed. However, notably because of the constituent half-cylindrical solid parts the described sensor cannot constitute a cable which can be wound and deformed. Moreover, nothing is disclosed as regards its suitability for burial in the ground or as regards its detectivity in such operating conditions.

The problem to be solved in the realization of a pressure sensor which is capable of providing perimeter protection of a site in order to detect the presence of an intruder whose weight acts on the sensor without him knowing so, the sensor being intended for large sites so that ease of manipulation and installation by non-expert personnel are necessary.

SUMMARY OF THE INVENTION

The solution to this problem consists in that the pressure sensor is formed by a continuous cable which can be buried and which comprises at least one optical fiber which, when buried is capable of detecting, along its entire length components of a pressure applied to a surface zone of the ground, the pressure member having a repetitive structure in the longitudinal direction which is formed by an upstream structure and a downstream structure which are situated in front of and behind the optical fiber, viewed in the direction from the zone of the ground surface where the pressure is applied towards the optical fiber, the width of the upstream structure being at least approximately 1 cm.

The upstream structure serves to capture the components of the pressure applied, even when the zone of application is not directly the cable, and to apply these components to the optical fiber, while the downstream structure serves to maintain the optical fiber in position when the cable is buried in the ground. Thus, in the perimeter protection mode the sensor is unwound and buried in the ground at a given depth. It should cover a given zone of the ground and, therefore, it is arranged in a meander-like fashion in order to achieve a high efficiency for a wide lateral zone and detect an intruder, if any, in this passage zone. Activation will be caused by the weight of the intruder. It may be that this weight is not applied perpendicularly above the cable, so that the resultant pressures are small and poorly oriented in the direction of the sensor; however, they must still be detected. When a bare optical fiber is buried, the activation forces will be very weak. Actually, the pressure due to the weight applied to the surface is attenuated because the forces are dispersed in the soil, on the one hand and because the optical fiber has a very small dimension (in the order of 0.1 mm) on the other hand. Thus, depending on the nature of the soil and the depth of the optical fiber, a very large loss of sensitivity occurs, which may be as high as a factor 1000 for a depth of 15 cm.

However, because the activating force does not act linearly on the optical fiber as a function of distance, the detectivity of the cable for the small lateral forces applied at a distance from the cable must be enhanced to a maximum. In order to recover a part of said loss of sensitivity and to enhance the lateral detectivity in accordance with the invention the optical fiber is arranged between sheets having large lateral dimensions with respect to the diameter of the optical fiber, the sheets being oriented so that the lateral detectivity is enhanced. The width of the upstream structure and the downstream structure must be at least approximately 1 cm corresponding to 100 times (50 times) the diameter of 125 micrometers (250 micrometers) of the cladding glass.

Moreover, because the cable must be installed by personnel performing spadework, the material must be sturdy. In accordance with the invention, the pressure member of the cable may have a continuous structure or a segmented structure.

In a first embodiment the upstream and downstream structures are formed by two semi-rigid continuous sheets which are provided with bending means so that said sheets can be bent in arbitrary zones along their length in the osculating plane of each sheet in each zone. "Semi-rigid" is to be understood to mean that the sheets are sufficiently rigid to transfer the pressures and flexible enough to be wound in their longitudinal direction.

In a second embodiment, the upstream and downstream structures of the pressure member are formed by segments which are spaced apart so that the cable can be wound and also bent in the transverse direction.

The upstream and downstream structures must be sufficiently rigid so as to prevent excessive local deformation under the influence of the weight of the intruder and must transfer the captured force substantially completely to the optical fiber. The constituent material must be hard enough to compress the optical fiber through its protective cladding. The surface of the upstream structure must be large enough to offer effective detectivity.

The two structures may present different characteristics notably for detecting the lateral forces, and which will be described hereinafter for various embodiments.

BRIEF DESCRIPTION OF THE DRAWINGS

The invention will be described in detail hereinafter with reference to the accompanying drawings; therein.

DETAILED DESCRIPTION OF PREFERRED EMBODIMENTS

Figure 1:
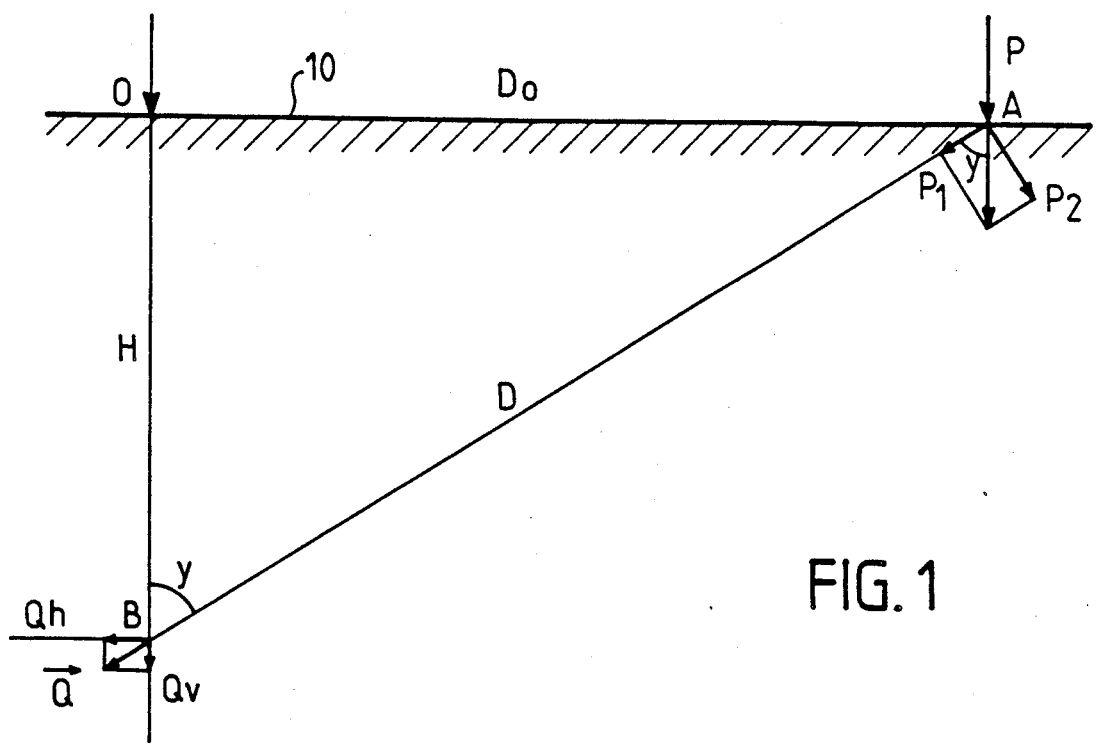
FIG. 1 shows a force composition diagram.

FIG. 1 shows a ground surface 10 and a force per unit area P applied to a point A. The problem is to know the resultant force at a point B situated at a distance D from the point A and a depth H perpendicular to the point O on the ground surface. The force P applied at A will have an active component P1 in the direction from A to B. This component P1 will be transmitted by the soil over the distance D and will be appear in attenuated form as a force Q at the point B. This force Q has a vertical component $Q_v$ and a horizontal component $Q_h$.

It is assumed that the section of the cable coincides with the point B. When the angle OBA is referred to as y, in a first approximation $Q=k.P1/D^2$, where k is an attenuation coefficient, so that $$Q = \frac{k \cdot P \cdot \cos y}{D^2} = \frac{k \cdot P}{H^2} \cdot \cos^3 y$$

When the force P is applied at O perpendicularly to the point B, the force Q applied at B is referred to as $Q_O$ so that $Q_O=k.P/H^2$.

Referring to $Q_O$, for a force P applied at an arbitrary angle y:
the vertical component $Q_v=Q_O\cos^4 y$
the horizontal component $Q_h=Q_O\cos^3 y . \sin y$.

When the components $Q_v$, $Q_h$ are applied to the horizontal and vertical surfaces $S_h$ and $S_v$, respectively, the applied forces $$F_v=S_h \cdot Q_o \cdot \cos^4 y \qquad (1)$$

$$F_h=S_v \cdot Q_o \cdot \cos^3 y \cdot \sin y \qquad (2)$$

are obtained.

It will be evident that for the same surface areas $F_h$ will be larger than $F_v$ for y larger that 45°; the reverse will be the case of y smaller than 45°. Thus, if the detection of forces applied quite far from the normal to the cable is to be privileged, the vertical receiving surfaces are attractive. Nevertheless, it is also necessary to detect the forces applied substantially in the direction of the normal to the cable, thus preserving a detection capacity for these forces with horizontal surfaces. Thus, in accordance with the invention the possibilities for the detection of remote forces are enhanced while the possibilities of detection of forces applied substantially normal to the cable are not excessively reduced.

Figure 2:
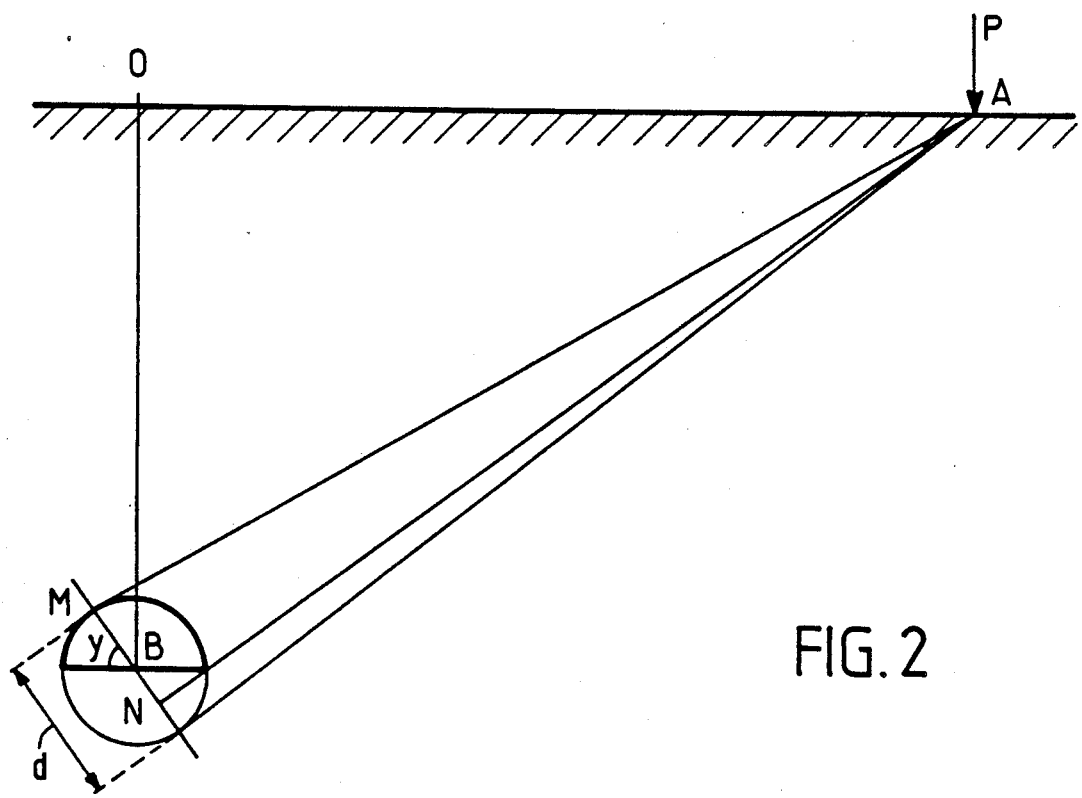
FIG. 2 shows a diagram illustrating the application of the forces to a prior art half-cylindrical pressure member.
Figure 3:
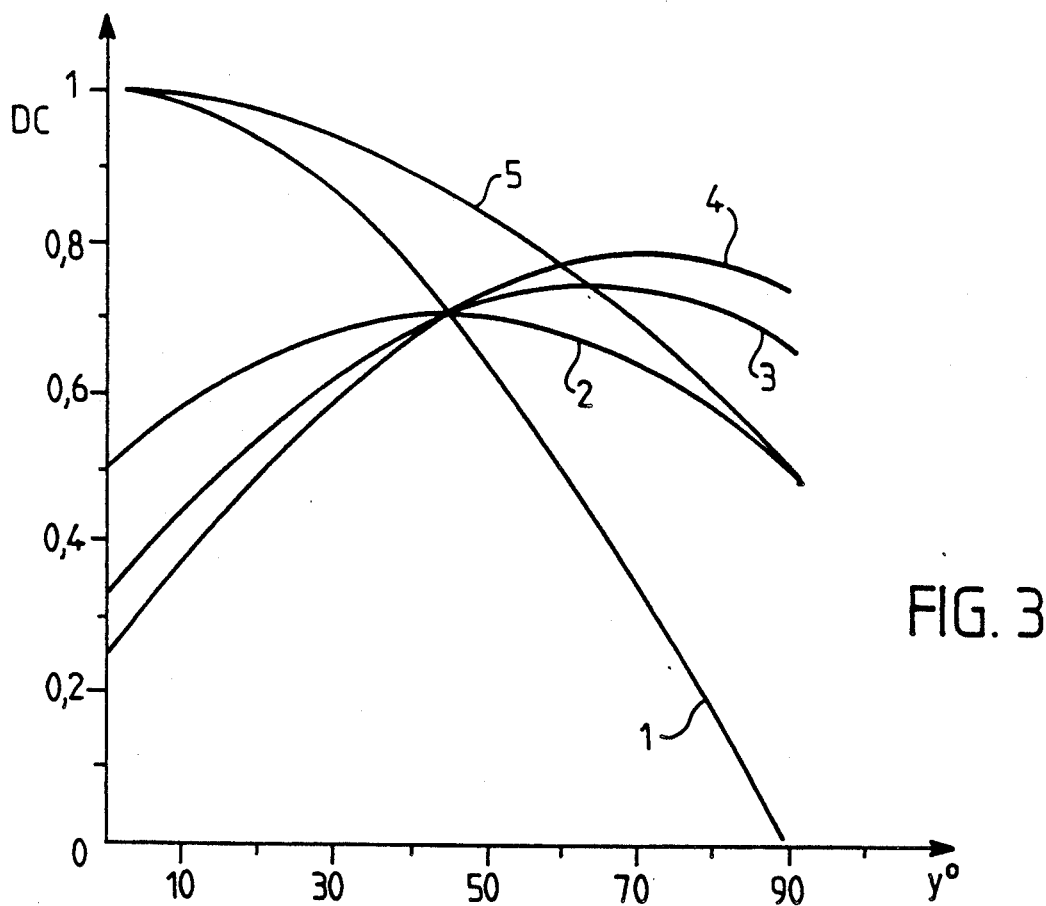
FIG. 3 shows, for different orientations of the pressure member, the detection sensitivity curves as a function of the distance between the point of application of the force and the axis of the cable.

The prior art sensor which comprises a pressure member formed by two half-cylindrical rigid parts, does not have this property. Apart from the fact that it is not conceived to form a cable which can be wound and bent and the cited document does not state how to achieve this, the structure of the pressure member is not optimized for the detection of forces applied very far from the normal to the cable which, therefore, can reach the cable only in a strongly attenuated form. Therefore, FIG. 2 shows such a pressure member. When a pressure P is applied to the point A, in a first approximation it may be stated that the portion of the upper half-cylinder, having the diameter d, which is exposed to the components of the forces originating from A will be equivalent to a slice MN. It can be readily calculated that MN is approximately 0.5 d (1+cos y). For simplified cases, this result and the equations (1) and (2) enable the curves of the detectivity DC to be obtained for a given surface of the pressure member, which curves are represented by arbitrary units in the FIG. 3 as a function of the angle y.

The curve 1 relates to a horizontal slice which is situated above the optical fiber of the sensor (DC proportional to cos y).

The curve 2 relates to a horizontal slice and a vertical slice which are situated so as to alternate and which have the same length (DC proportional to ½ (cos y+sin y)).

The curve 3 concerns the same case as the curve 2, be it with a vertical slice having twice the length (DC proportional to ⅓ (cos y+2 sin y)).

The curve 4 relates to the same case as the curve 2, be it for a vertical slice having three times the length (DC proportional to ¼ (cos y+3 sin y)).

The curve 5 relates to a sensor whose upper element is shaped as a half-cylinder.

It appears that the structures corresponding to the curves 2, 3 and 4 are particularly attractive for increasing the lateral sensitivity of the cable, because they have a maximum for large angles y. Their lower sensitivities for small angles y do not constitute a drawback because the forces to be detected at these angles are much greater so that the overall detectivity of the sensor is more uniform.

Figure 7:
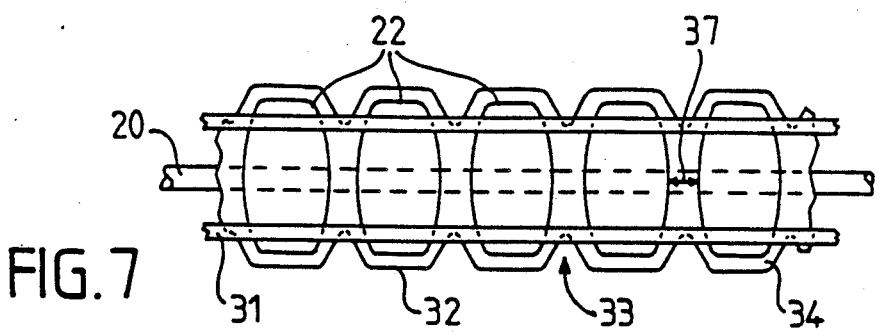
FIG. 7 diagrammatically shows a cable comprising a segmented pressure member.
Figure 8:
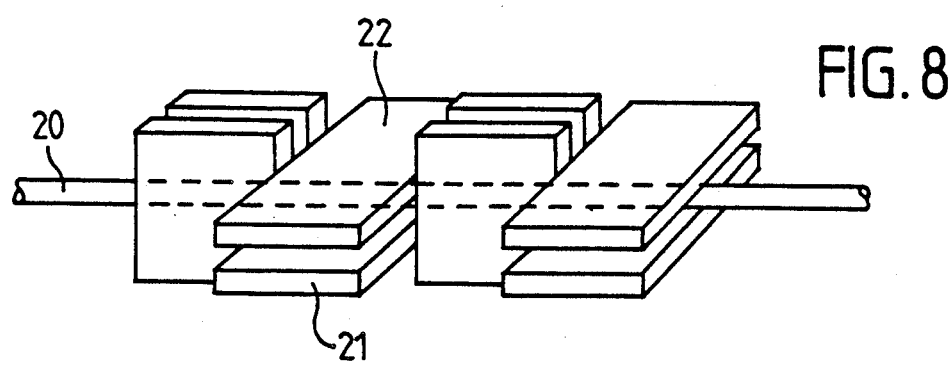
FIG. 8 diagrammatically shows a cable comprising a segmented pressure member, the segments being alternately oriented in two substantially orthogonal directions.

Thus, depending on whether the lateral sensitivity is to be increased or whether a lower lateral detectivity is to be accepted so as to obtain a less complex cable which is easier to realize and to install by non-expert personnel, different types of sensors having a cable structure are used in accordance with the invention. Cables can be distinguished for which the upstream and downstream structures are continuous (FIGS. 4A, 4B, 4C, 5, 6A, 6B) and also cables for which they are discontinuous (FIGS. 7 and 8).

Figure 4A:
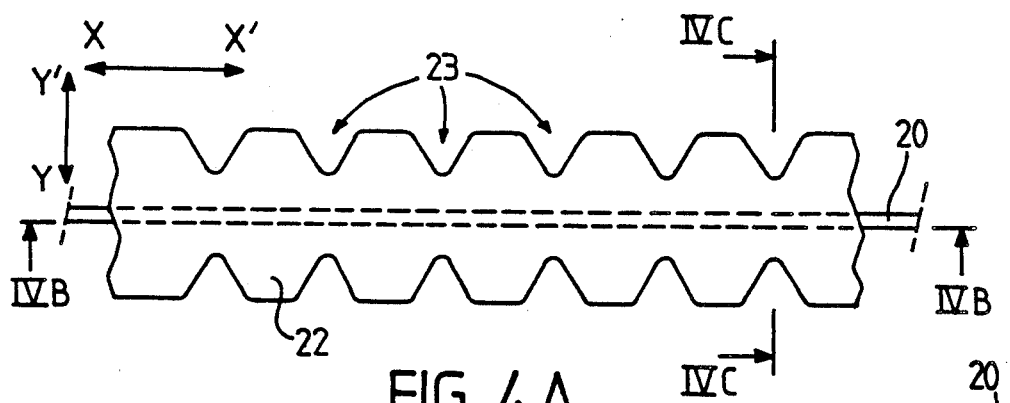
FIGS. 4A, 4B, and 4C are diagrammatic plan views and sectional views of a cable comprising a pressure member having a cronated continuous structure.
Figure 4B:
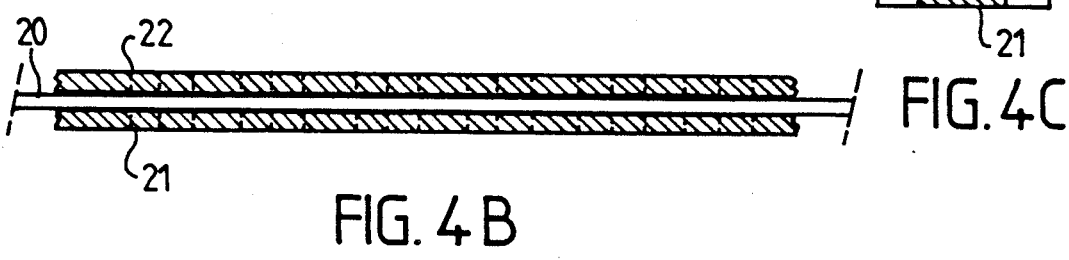
Figure 4C:
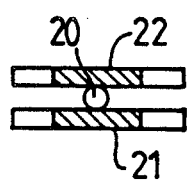

FIGS. 4A, 4B, 4C relate to a cable which favors the vertical forces. It comprises an upstream structure 22 and a downstream structure 21 which enclose the optical fiber 20. These structures consist of semi-rigid continuous sheets for transferring the forces, which sheets are also flexible enough so that they can be wound in the longitudinal direction XX'. They can thus be wound onto reels. These sheets may be flat or slightly curved plates. In general, they have surfaces which may be non-flat in which case reference is made to the osculating plane of said surface.

During use it is generally necessary to arrange the cable in a meander-like fashion, i.e. it must be bent in order to follow the contour, for example of obstacles and to cover a maximum surface with a maximum efficiency. For an upstream surface to remain an upstream surface after bending, bending must take place substantially in the plane of the sheet. Therefore, the upstream and downstream structures are provided with notches 23 enabling such bending. In this case the bending means are formed by pairs of peripheral notches provided at the opposite sides of each sheet. It may be that they do not register on both structures.

Figure 5:
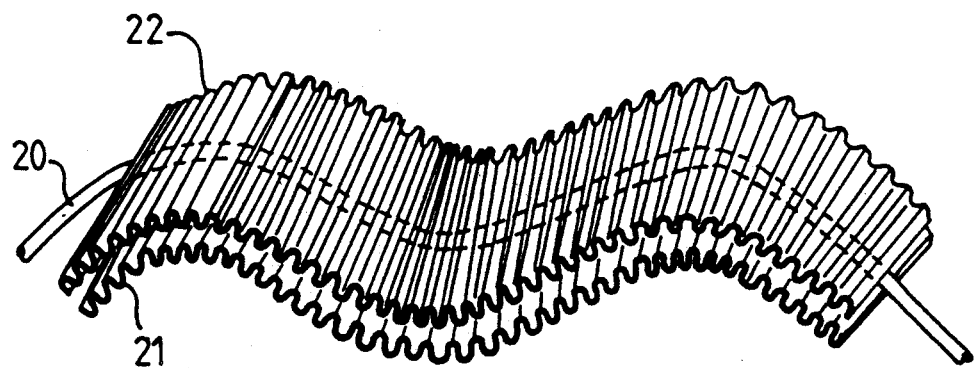
FIG. 5 diagrammatically shows a cable comprising a pressure member having an accordion-like continuous structure.

Another method of enabling such bending is shown in FIG. 5. In this case the upstream and downstream structures are folded in an accordion like fashion. As before, they may comprise notches.

Figure 6A:
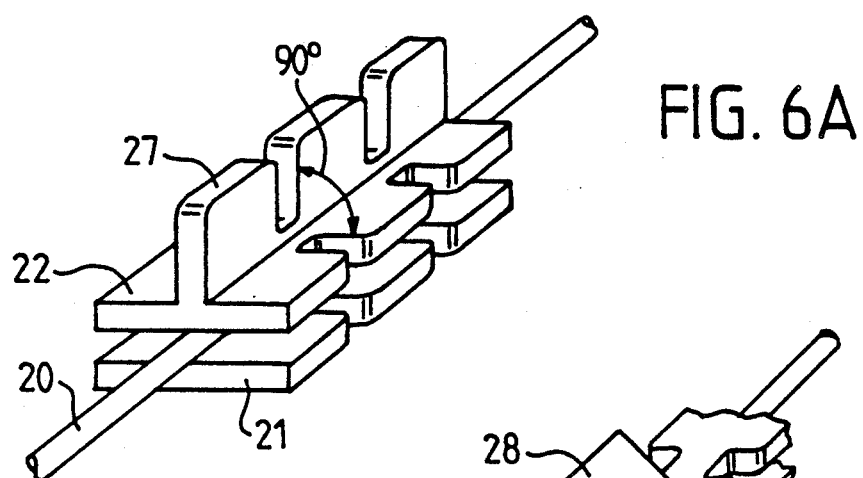
FIGS. 6A and 6B diagrammatically shows two cables comprising a continuous pressure member provided with ribs oriented at 90° or 45° with respect to the applied forces.
Figure 6B:
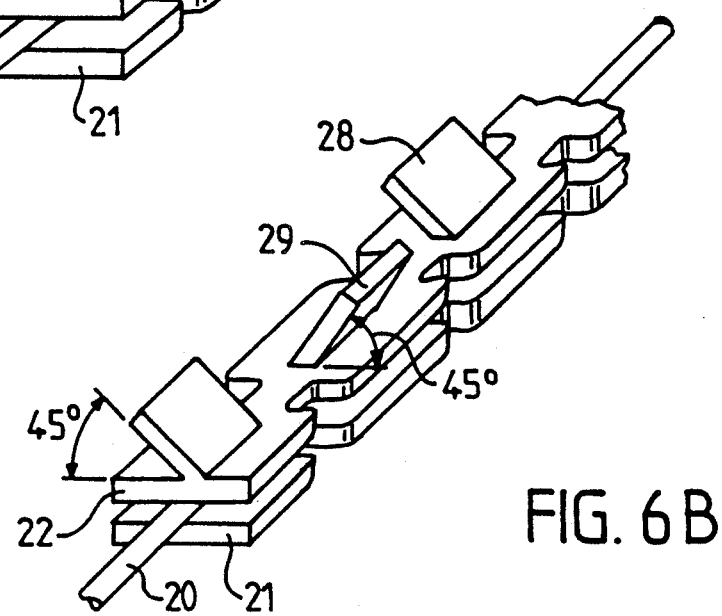

FIGS. 6A and 6B show two sensors where the sensitivity to lateral forces is enhanced. In this case the upstream structure comprises projecting rigid central ribs which serve to capture the components of the pressure forces which extend substantially parallel to the osculating plane to the sheet. It may concern a series of central ribs 27, 28, 29, each of which is arranged between two consecutive arbitrary notches of the sheet of the upstream structure. The surfaces of the ribs 27 may be substantially orthogonal to the surface of the sheet of the upstream structure (FIG. 6A). The ribs 28, 29 may alternatively be oriented at an angle of +45° and −45° with respect to the osculating plane to the upstream sheet of the upstream structure (FIG. 6B). The forces intercepted by these ribs are transferred to the optical fiber 20 by means of the sheet 22. The upstream structure is thus formed by the sheet 22 and the ribs 27, 28, 29.

FIG. 7 shows a cable whose upstream and downstream structures are discontinuous. FIG. 7 shows only the upstream structure 22. The structures are segmented, the segments being spaced apart so to allow longitudinal winding of the cable and bending in the transverse direction. It can be ensured that the distance which separates the upstream and downstream structures of two consecutive segments in the longitudinal direction of the cable is smaller at the center (distance 37) than at the periphery of the cable. The upstream structure may be formed by a sheet, a strip or a rigid or semi-rigid half-cylinder, and the downstream structure may be formed by a sheet or a rigid or semi-rigid strip. The sheets or the strips of the upstream structure on the one hand and of the downstream structure on the other hand may be interconnected by flexible strips 31 which may be slightly extendable and which are accommodated in a flexible cladding 34 which may comprise notches 33.

FIG. 8 shows a sensor whose pressure member is formed by segments whose successive upstream structure alternately detect the components of the pressure acting in substantially orthogonal directions. Each segment is formed, for example by two plates 22, 21 which form the upstream and downstream structures and which are alternately arranged horizontally and vertically. When the cable is arranged on the ground, it can be disposed so that each pair of plates encloses an angle of approximately 45° with respect to the vertical. Each segment is spaced sufficiently far from the preceding segment in order to enable winding and bending of the cable. The assembly may be accommodated in a flexible envelope which interconnects the segments.

Figure 9A:
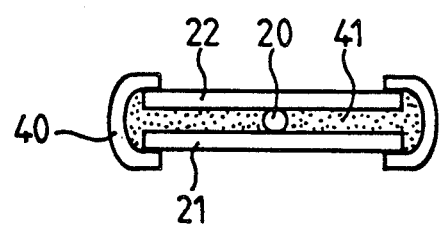
FIGS. 9A, 9B diagrammatically illustrate two means for interconnecting the upstream and downstream structures.
Figure 9B:
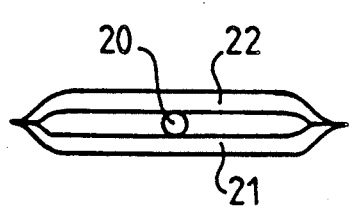

FIGS. 9A and 9B relate to the interconnection of the upstream and downstream structures. FIG. 9A shows a clamping band 40 which clamps the upstream structures 22 and the downstream structures 21 together along their periphery. This band may be fixed by forcing, folding, soldering—or any other fixing means. FIG. 9B shows another interconnection means which may consist of the pinching or folding of the structures 22 and 21 along their periphery. The upstream and downstream structures are thus interconnected either by means of a peripheral clamping band or by pinching, folding or soldering the lateral edges.

In all of the above cases the upstream and downstream structures may be held together by a flexible envelope 34, 41 which interconnects the structures and can ensure tightness of the cable. This flexible envelope may not attenuate the transmission of the forces to the optical fiber. The interconnection of the two plates may also be obtained by using the flexible envelope 41 without using clamping bands.

The described embodiments of the cable comprise a central optical fiber 20. It will be evident that several optical fibers can be arranged between the upstream and downstream structures, thus increasing the detectivity of the cable. When a given cable length is used, the two optical fibers are then first cut to the desired length after which they are interconnected in order to ensure optical continuity. This connection is obtained by means and techniques known to those skilled in the art.

Figure 10:
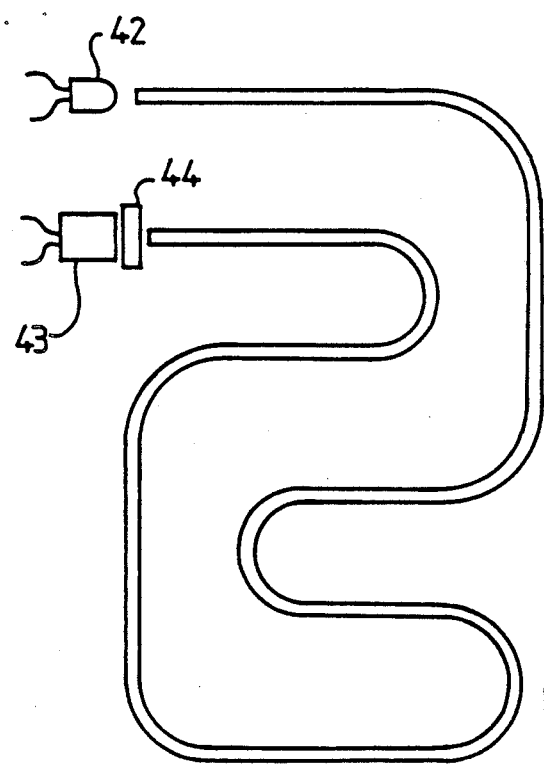
FIG. 10 diagrammatically shows an example of the arrangement of the cable with respect to the optical light detection means.

FIG. 10 shows an example illustrating the arrangement of a cable in accordance with the invention. It is disposed in meanders in order to cover a given ground surface. A light emitter 42 (for example, a polarized light laser) is arranged at one end and the light transmitted by the cable is detected, via a polarizer 44, by a detector 43 which is connected to electronic detection circuits. These circuits measure, for example, the variation of the polarization state induced into the optical fiber by its photo-elasticity. The distance separating two parts of the cable is, for example from 0.20 to 1 m. The plates are, for example steel sheets having a width of a few centimeters (from 1 to 10 cm, for example) and a thickness of some tenths of a millimeter (for example from 0.2 to 0.4 mm). Other materials such as copper alloys (for example, CHRYSOCAL), hard plastics, compound materials are also suitable. The optical fiber is formed, for example, by a glass core having a diameter of 10 micrometers which is enveloped by a glass cladding having a diameter of 125 micrometers provided with a plastics protective cladding, thus resulting in an external diameter of approximately 250 micrometers.

We claim:

1. A fiber-optical rigid or semi-rigid pressure sensor, comprising a pressure member which encloses the optical fiber in a sandwich-like fashion in order to modify its optical properties as a function of a pressure applied to the sensor, wherein the pressure sensor is formed by a continuous cable which can be buried and which comprises at least one optical fiber which, when buried, is capable of detecting, along its entire length, components of a pressure applied to a surface zone of the ground, the pressure member having a repetitive structure in a longitudinal direction which is formed by an upstream structure and a downstream structure which are situated in front of and behind the optical fiber, viewed in the direction from the zone of the ground surface where the pressure is applied towards the optical fiber, the width of the upstream structure being at least approximately 1 cm, the pressure member being such that it enables the cable to be wound upon itself in a longitudinal direction and, when unwound, to be bent in a direction transverse to the longitudinal direction.

2. A sensor as claimed in Claim 1, wherein the upstream and downstream structures are formed by two semi-rigid continuous sheets having an osculating plane, which sheets are provided with bending means so that said sheets can be bent in arbitrary zones along their length in the osculating plane of each sheet in each zone.

3. A sensor as claimed in claim 2, wherein the bending means are formed by folding said sheets in an accordion-like fashion.

4. A sensor as claimed in claim 2, wherein the bending means are formed by pairs of peripheral notches formed at the opposite sides of each sheet.

5. A sensor as claimed in claim 4, wherein the upstream structure comprises at least one projecting central rib which serves to capture the pressure components extending substantially parallel to the osculating plane of the sheet.

6. A sensor as claimed in claim 5, wherein the upstream structure comprises a succession of central ribs, each of which is situated between two arbitrary consecutive notches of the sheet of the upstream structure.

7. A sensor as claimed in claim 6, wherein the ribs and sheet of the upstream structure have a surface and said surface of the ribs is substantially orthogonal to the surface of the sheet of the upstream structure.

8. A sensor as claimed in claim 1 wherein the upstream and downstream structures are interconnected by means selected from the group of a peripheral clamping band, the pinching, folding or soldering of the lateral edges, and a flexible envelope.

9. A sensor as claimed in claim 1, wherein the upstream and downstream structures of the pressure member are segmented, the segments being spaced apart so as to enable the winding of the cable and its bending in the transverse direction.

10. A sensor as claimed in claim 9, wherein the segments are identical and for the bending of the cable, the distance which separates the upstream structures on the one side and the downstream structures on the other side of two consecutive segments, viewed in the longitudinal direction of the cable, is smaller at the center than at the periphery of the cable.

11. A sensor as claimed in claim 9, wherein the pressure member is formed by segments whose successive upstream and downstream structures alternately detect the pressure components acting in substantially orthogonal directions.

12. A sensor as claimed in claim 11, wherein the upstream structure is formed by a sheet, a strip or a rigid or semi-rigid semi-cylinder, the downstream structure being formed by a sheet or a rigid or semi-rigid strip.

13. A sensor as claimed in claim 12, wherein the sheets or the strips of the upstream structure on the one side and the downstream structure on the other side are interconnected by way of flexible strips.

14. A sensor as claimed in claim 1, wherein the upstream and downstream structures are accommodated in a flexible envelope in order to keep these structures in position around the optical fiber.

15. A fiber-optical rigid or semi-rigid pressure sensor comprising a pressure member which encloses the optical fiber in a sandwich-like fashion in order to modify its optical properties as a function of a pressure applied to the sensor, wherein the pressure sensor is formed by a continuous cable which can be buried and which comprises at least one optical fiber which, when buried, is capable of detecting, along its entire length, components of a pressure applied to a surface zone of the ground, the pressure member having a repetitive structure in a longitudinal direction which is formed by an upstream structure and a downstream structure which are situated in front of and behind the optical fiber, viewed in the direction from the zone of the ground surface where the pressure is applied towards the optical fiber, the width of the upstream structure being at least approximately 1 cm, the pressure member being such that it enables the cable to be wound upon itself in a longitudinal direction and, when unwound, to be bent in a direction transverse to the longitudinal direction; the upstream and downstream structures being formed by two semi-rigid continuous sheets having an osculating plane, which sheets are provided with bending means so that said sheets can be bent in arbitrary zones along their length in the osculating plane of each sheet in each zone, the bending means being formed by pairs of peripheral notches formed at the opposite sides of each sheet; and wherein the upstream structure comprises a succession of central ribs, each of which is situated between two arbitrary consecutive notches of the sheet of the upstream structure, said ribs being alternately oriented to enclose an angle of +45° and −45° with respect to the osculating plane of the sheet of the upstream structure.

* * * * *